(12) United States Patent
Spark

(10) Patent No.: US 7,857,085 B2
(45) Date of Patent: Dec. 28, 2010

(54) OFF ROAD VEHICLE

(76) Inventor: Ian James Spark, P.O. Box 377, Churchill, Victoria (AU) 3842

( * ) Notice: Subject to any disclaimer, the term of this patent is extended or adjusted under 35 U.S.C. 154(b) by 0 days.

(21) Appl. No.: 12/315,197

(22) Filed: Nov. 13, 2008

(65) Prior Publication Data
US 2009/0159356 A1 Jun. 25, 2009

Related U.S. Application Data

(62) Division of application No. 10/889,165, filed on Jul. 13, 2004, now Pat. No. 7,464,785.

(51) Int. Cl.
*B62D 6/00* (2006.01)
(52) U.S. Cl. .................. 180/236; 180/242; 180/411
(58) Field of Classification Search ............. 180/234, 180/236, 242
See application file for complete search history.

(56) References Cited

U.S. PATENT DOCUMENTS
6,807,466 B2 * 10/2004 Strothmann ................ 701/1

FOREIGN PATENT DOCUMENTS
| EP | 325298 A2 * | 7/1989 |
| WO | WO 0032462 A1 * | 6/2000 |
| WO | WO 0228677 A1 * | 4/2002 |
| WO | WO 03059720 A1 * | 7/2003 |

* cited by examiner

*Primary Examiner*—Kevin Hurley (57) ABSTRACT

The invention describes vehicles where the steering effect of the driver-selected wheel angles is made identical to the steering effect of positively and independently driving the driven wheels.

Means of delivering most of the power to each of the driven wheels by means of shaft drives is also described. Here speed-correcting differentials are close coupled to each driven wheel where the first input to the said differentials is by means of shaft drives, and the second input to the said differentials is provided by means of speed-correcting hydraulic or electric motors.

20 Claims, 7 Drawing Sheets

OFF ROAD VEHICLE

This is a Divisional Application of prior application Ser. No. 10/889,165 filed Jul. 13, 2004, now U.S. Pat. No. 7,464,785. The prior application was examined by Kevin Hurley of Art Unit 3611.

TECHNICAL FIELD

The invention relates to a means of increasing the tractability, stability, maneuverability and safety of wheeled vehicles while at the same time minimising fuel consumption and damage to the ground traversed, where most of the power is delivered to the driven wheels by means of mechanical shaft drives.

DESCRIPTION OF PRIOR ART

The following patents or patent applications allude to the problem to be solved by the present invention, but do not go far enough to describe a complete solution.

WO 98/19875 A1 (GRANT, publication date 14 May 1998) merely states that the drive wheel speeds and angles are calculated by a computer.

WO 00/32462 A1 (Grant, publication date 19 Jun. 2000) describes equations for drive wheel speeds and wheel angles. These equations are hard to decipher since the variables are poorly defined. Grant's equations for wheel speed may approximate to the correct equations when the radius of curvature of the path of the vehicle is large.

U.S. Pat. No. 4,237,994 A (MCCOLL, priority date Aug. 17, 1978) refers to "desired" wheel speeds and "desired" wheel angles, but does not say what these are or how the are calculated.

PCT/AU95/00264=WO 95/30567 A1 (SPARK, priority date May 6, 1994) describes two wheel drive vehicles and four wheel drive vehicles where skidding and scuffing are substantially avoided. Here equations are given whereby the wheel angles are calculated from dimensions of the vehicle and the speeds of the left hand and right hand drive wheels—where the latter are selected by the driver by means of left hand and right hand steering levers.

There are two disadvantages of this means of driver control. Firstly there is only a limited range of wheel speed ratios for which scuffing can be avoided. Outside this range there are no wheel angles that can avoid scuffing. Secondly for any allowable wheel speed ratio, there are generally two sets of wheel angles, which will avoid scuffing. One set will involve a large radius of curvature for the path of the vehicle and small wheel angles, and the other vice versa.

Although the use of a steering wheel or rotatable joystick is foreshadowed, the control equations given are clumsy and inadequate in so far as they deduce the drive wheel speed ratio from the rotation of the steering wheel or joystick according to an empirical equation, and then deduce the wheel angles from the said drive wheel speed ratio. This means that the disadvantages, alluded to above, that are associated with the use of steering levers (with their unlimited range of drive wheel speed ratios) will still apply.

PCT/AU01/01247=WO 02/28677 A1 (SPARK, priority date Oct. 3, 2000) does disclose a set of equations for calculating the individual speeds of the driven wheels and the angles of all the wheels that will ensure that the steering effect of the speed of the individual driven wheels is identical to the steering effect of all the wheel angles. The steering effect of a means of steering is defined as the centre of curvature of the path of the vehicle that would result if the said steering effect was acting alone.

SPARK (01247) discloses hydrostatic wheel motors as the means of driving the driven wheels. This drive means has the advantage of allowing a range of wheel angles in excess of 180 degrees. The disadvantage of this drive means is that it tends to be less efficient than a mechanical drive.

U.S. application Ser. No. 10/889,165 was judged by the examiner to claim more than one invention. This divisional application reclaims some of the claims in SPARK 10/889,165 that had to be withdrawn.

BACKGROUND

There are two basic methods of maneuvering a wheeled vehicle. One method is to turn one or more steerable wheels. The other method is to drive one or more left hand wheels independently of one or more right hand wheels. In general these two steering systems will conflict with one another when each tries to achieve a different centre of curvature for the path of the vehicle. This conflict causes a braking effect, which results in fuel wastage, scuffing of the ground traversed and associated tyre wear.

The traditional method of avoiding conflict between the two basic steering systems is to disable one system so that it cannot conflict with the remaining system. For example in a traditional road vehicle, the steering effect of driving the drive wheels at the same speed is eliminated by incorporating a differential into the drive train to the driving wheels. Conversely in a zero turn radius vehicle which is steered by driving the left hand drive wheel independently of the right hand drive wheel, the steering effect of one or more non driven wheels is eliminated by rendering the latter free to turn to any angle. That is, they are turned into castors.

The Problems to be Solved

Unfortunately, making one steering system compliant with the other leads to stability and traction problems when the vehicle is operated in difficult conditions. If the sideways, forwards or backwards force on the vehicle increases and/or the coefficient of friction between the tyres and the ground decreases, the system used to manoeuvre the vehicle will eventually fail. For example, the differential becomes the Achilles' Heel of the traditional tractor when working on steep terrain, and especially in slippery conditions. In this environment weight is transferred from the uphill drive wheel making it liable to spinning. Although the stability of the traditional tractor can be improved by the use of a limited slip differential or a lockable differential, it is somewhat illogical to provide a differential in the first instance along with a subsidiary system which either impedes its operation, or stops it altogether.

Similarly it can be seen that the Achilles' heel of the zero turn radius vehicle when traversing a steep slope are the non-driven castors. Because these castors cannot exert any sideways force on their end of the vehicle, the tendency for this end to swing down the hill can only be prevented by the two drive wheels applying opposing forces to the vehicle—even though they may be driven at the same speed. As the steepness of the slope traversed increases, the uphill drive wheel eventually loses traction and the front of the vehicle swings down the hill. In short, the grip of the drive wheels on the ground is exhausted by the drive wheels fighting against each other in providing the torque necessary to stop the castored end of the vehicle swinging down the hill.

A method of overcoming the problems of traction and stability is to allow both steering systems to operate, but to allow one steering system to dominate the other. In this case the stability and traction problems are reduced at the expense of the introduction of a scuffing problem on turning. For example the elimination of the differential from the rear axle of four wheeled motor bikes improves traction at the expense of introducing a scuffing problem.

A more extreme example of conflict between the two basic methods of maneuvering a vehicle occurs in skid steer vehicles (both wheeled and tracked). In this case the dominant steering system is the independent drive to the right hand and left hand drive wheels or tracks. The second enabled but dominated steering system is the wheel or track angle which is usually fixed at zero degrees and tends to drive the vehicle straight ahead. The conflict between the two steering systems causes the vehicle to take a path which is a compromise between the paths that would be produced by each system alone. This method of maneuvering causes extreme scuffing with associated ground damage, fuel wastage and tyre or track wear.

In traditional vehicles, rotation and translation are generally linked. Translation of the vehicle along a curved path usually involves rotation, and rotation of the vehicle always involves translation. As a consequence, rotation and translation in a confined space can be a problem. Vehicles steered by independently driving the left and right hand wheels have improved maneuverability since they can be made to rotate about their own centre. This is pure rotation (i.e. without translation). Maneuverability can be further increased by allowing translation in any direction without the need for rotation. This pure translation is sometimes referred to as crab steering.

The Solution Proposed Previously

The essential feature of the invention previously proposed by Spark (Australian Provisional Application PR 0473 (03-10-2000) and Patent Cooperation Treaty Application PCT/AU/01247 (03-10-2001)) is that both basic systems of maneuvering a vehicle are to be used in unison so that they both try to produce the same centre of curvature for the path of the vehicle. With both systems reinforcing each other it will be possible to effectively manoeuvre the vehicle in much more difficult conditions than if only one system was used with the other system either disabled or dominated. Furthermore any centre of curvature can be selected by the driver, which further improves the maneuverability of the present invention. This enables the invented vehicle to execute either pure rotation or pure translation or any combination of translation and rotation.

The preferred means of driver control of the four wheel steering/four wheel drive variant of the previously proposed invention is by means of a rotatable joystick. This maximises the maneuverability of the vehicle by allowing independent translation and rotation of the vehicle. In this means of driver control, the direction of translation of the vehicle is determined by the direction of displacement of the joystick, whereas the rotation of the vehicle is determined by the degree of rotation of the joystick. The amount of displacement of the joystick determines the root mean square of the four wheel speeds. Pure translation occurs when the joystick is displaced but not rotated. Pure rotation occurs when the joystick is twisted as far as it will go.

Alternatively, two separate devices could be used for driver control. One joystick could be used to determine the radius of curvature of the path of the vehicle and the root mean square wheel speed, and the second joystick could be used to determine the direction of the centre of curvature.

Alternatively, a joystick, steering wheel, knob or lever could be used to determine the radius of curvature of the path of the vehicle, and a separate joystick could be used to determine the direction of the centre of curvature of the path of the vehicle and the root mean square wheel speed.

DRAWINGS

In order that the present invention may be more clearly understood, some preferred embodiments thereof will now be described with reference to the accompanying drawings. Although a four wheel steering/four wheel drive vehicle will be described, it will be appreciated that the principles invoked can be applied to any vehicle with more than one wheel.

THE PREFERRED EMBODIMENT

Figure 1A:
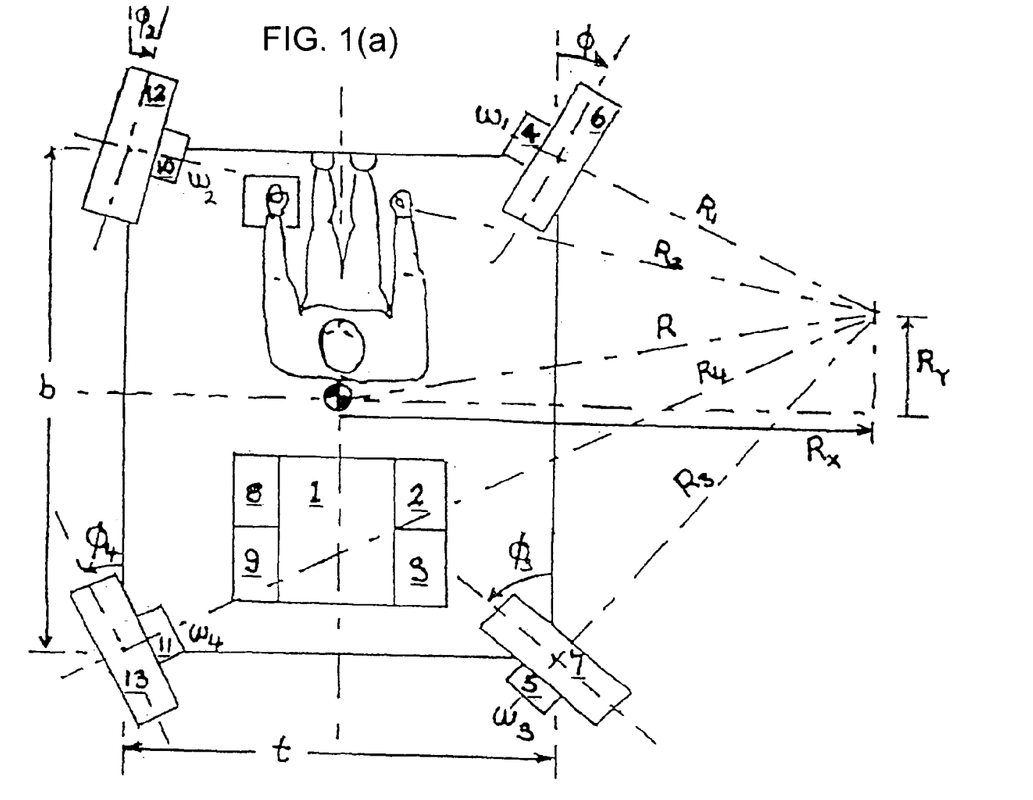
FIG. 1(a) is a plan view of the most general four wheel steering/four wheel drive variant of the invention.

In the four wheel steering/four wheel drive variant of the invention depicted in FIG. 1, an internal combustion engine 1 drives two right hand variable displacement hydraulic pumps 2 and 3 which in turn drive hydraulic motors 4 and 5 mounted in the steerable front and rear right hand wheels respectively. The internal combustion engine 1 also drives left hand variable displacement pumps 8 and 9 which in turn drive hydraulic motors 10 and 11 which are mounted in the steerable front and rear left hand wheels 12 and 13 respectively.

The effective angles of the wheels 6, 12, 7 and 13 are shown as $\phi_1$, $\phi_2$, $\phi_3$ and $\phi_4$ respectively.

The effective rotational speed of the wheels 6, 12, 7 and 13 are $\omega_1$, $\omega_2$, $\omega_3$ and $\omega_4$ respectively.

Figure 1B:
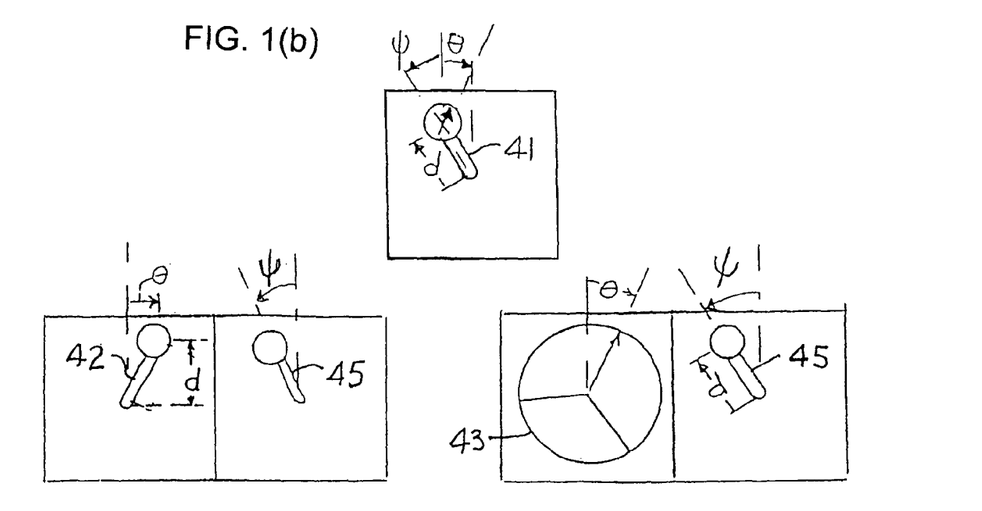
FIG. 1(b) shows three alternative driver interfaces for this vehicle.

The driver controls the vehicle by selecting the radius of curvature of the vehicle's path and the sense of rotation by rotating the joystick 24. If the joystick 24 is not turned the radius of curvature of the path of the vehicle will be infinity and the vehicle will move in a straight line parallel to the direction of displacement of the joystick 24. If the joystick 24 is twisted as far as it will go in a clockwise direction, the radius of curvature of the path of the vehicle will be zero and the vehicle will rotate clockwise about its own centre. Between these two extremes the radius of curvature of the path of the vehicle is given by:

$$\frac{R}{t} = \cot(90^0 \theta/\theta_{max}) = (R_X^2 + R_Y^2)^{1/2}/t$$

Where t is the track of the vehicle, $\theta$ is the rotation of the joystick and $\theta_{max}$ is the maximum rotation of the joystick 24.

If the driver displaces the rotatable joystick 24 at an angle $\psi$ to the straight ahead position, the direction of the of curvature of the path of the vehicle will by at right angles to the direction of joystick displacement and $R_X$ and $R_Y$ will be given by the following equations:

$$R_X = R/(\tan^2 \psi + 1)^{1/2} = R \cos \Psi$$

$$\text{and } R_Y = R \tan \psi/(\tan^2 \psi + 1)^{1/2} R \sin \Psi$$

The driver selects the direction of the centre of curvature by displacing the joystick 24 at right angles to this direction. The centre of curvature of the path of the vehicle is now specified by the two components $R_X$ and $R_Y$. He selects the root mean square of the four wheel speeds by the amount of displacement of the joystick 24.

The control system then rotates the four drive wheels to the following angles:

$$\tan \phi_1 = (b/2 - R_Y)/(R_X - t/2)$$

$$\tan \phi_2 = (b/2 - R_Y)/(R_X + t/2)$$

$$\tan \phi_3 = (b/2 + R_Y)/(R_X - t/2)$$

$$\tan \phi_4 = (b/2 + R_Y)/(R_X + t/2)$$

Where b is the wheel base of the vehicle, $R_Y$ is the displacement of the centre of curvature forward of the centre of the vehicle and $R_X$ is the displacement of the centre of curvature to the right of the centre of the vehicle.

The amount of displacement of the joystick d determines the root mean square of the four wheel speeds (RMSWS) according to the equation:

$$RMSWS = Kd = (\omega_1^2 + \omega_2^2 + \omega_3^2 + \omega_4^2)^{1/2}/2$$

where K is an appropriate constant.

The individual wheel speeds are given by the equations:

$$\omega_1 = KdR_1/RMSR \text{ where } R_1^2 = (b/2 - R_Y)^2 + (R_X - t/2)^2$$

$$\omega_2 = KdR_2/RMSR \text{ where } R_2^2 = (b/2 - R_Y)^2 + (R_X + t/2)^2$$

$$\omega_3 = KdR_3/RMSR \text{ where } R_3^2 = (b/2 + R_Y)^2 + (R_X - t/2)^2$$

$$\omega_4 = KdR_4/RMSR \text{ where } R_4^2 = (b/2 + R_Y)^2 + (R_X + t/2)^2$$

And RMSR is the root mean square radius, which is given by:

$$RMSR = (R_1^2 + R_2^2 + R_3^2 + R_4^2)^{1/2}/2 = (R_X^2 + R_Y^2 + t^2/4 + b^2/4)^{1/2}$$

Note that when the rotation of the joystick $\theta$ is a maximum the radius of curvature will be zero and the direction of the displacement d of the joystick 24 will be immaterial. It will be natural for the driver to push the joystick 24 forward in this case to commence rotation. Pulling the joystick back will commence rotation in the opposite direction.

If the above equations for wheel angles and wheel speeds are satisfied then the two basic methods of steering the vehicle will reinforce each other. Such a vehicle would combine the traction and stability of skid steer vehicles with the non scuffing advantages of traditional road vehicles. However the vehicle described above has much greater maneuverability since it is capable of both pure rotation and pure translation (in any direction).

THE GENERAL EMBODIMENT OF THE INVENTION

The general embodiment of the invention is shown in FIG. 1(a). Alternative means of driver control are shown in FIG. 1(b). The preferred means of driver control is by means of a rotatable joystick 41.

Alternatively, one joystick 42 could be used to determine the radius of curvature of the path of the vehicle and the root mean square wheel speed, and a second joystick 45 could be used to determine the direction of the centre of curvature.

Alternatively a steering wheel 43 (or steering knob or lever) could be used to determine the radius of curvature of the path of the vehicle and the root mean square wheel speed, and a second joystick 45 could be used to determine the direction of the centre of curvature.

A disadvantage of the variant of the invention described above is that four independent steering systems and four independent drive systems are required. It will be shown below that under special conditions the number of systems required can be reduced.

The First Special Case

Figure 2A:
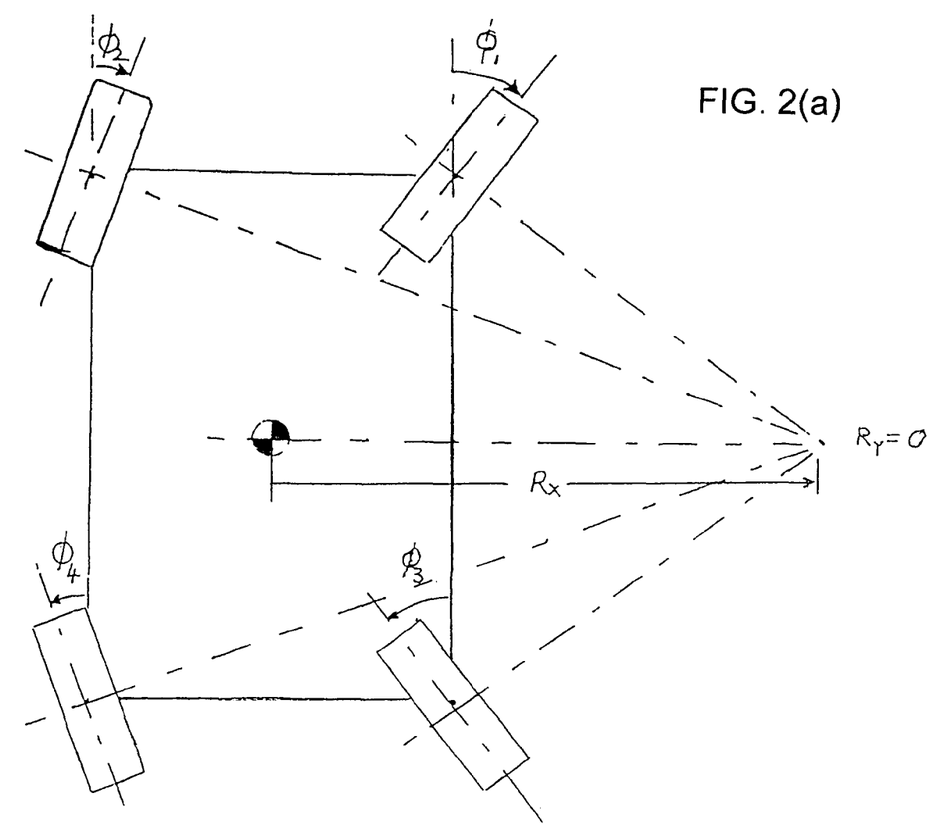
FIG. 2(a) depicts the special case where the centre of curvature of the path of the path of the vehicle lies on the transverse axis of the vehicle.

FIG. 2(a) shows that if $R_Y = 0$, the eight general control equations become:

$$\tan \phi_1 = (b/2)/(R_X - t/2)$$

$$\tan \phi_2 = (b/2)/(R_X + t/2)$$

$$\tan \phi_3 = (b/2)/(R_X - t/2) = \tan \phi_1$$

$$\tan \phi_4 = (b/2)/(R_X + t/2) = \tan \phi_2$$

$$\text{and } \omega_1 = KdR_1/RMSR \text{ where } R_2^2 = b^2/4 + (R_X - t/2)^2$$

$$\omega_2 = KdR_2/RMSR \text{ where } R_2^2 = b^2/4 + (R_X + t/2)^2$$

$$\omega_3 = KdR_3 RMSR \text{ where } R_3^2 = b^2/4 + (R_X - t/2)^2 = R_1^2$$

$$\omega_4 = KdR_4/RMSR \text{ where } R_4^2 = b^2/4 + (R_X + t/2)^2 = R_2^2$$

Where $RMSR = (R_X^2 + b^2/4 + t^2/4)^{1/2}$

In this case only two wheel angle control systems are required since $\phi_1 = \phi_3$ and $\phi_2 = \phi_4$.

Similarly only two wheel speed control systems are required since $\omega_1 = \omega_3$ and $\omega_2 = \omega_4$.

Figure 2B:
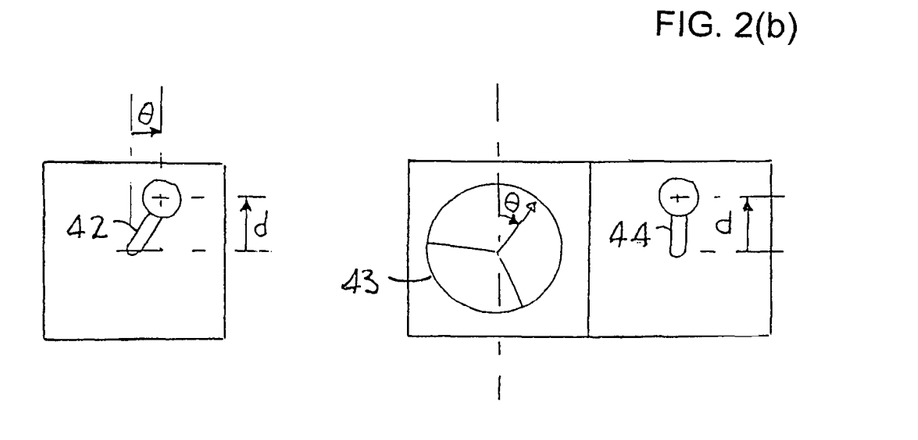
FIG. 2(b) shows two alternative driver interfaces for this vehicle.

In this case the rotatable joystick only needs to rotate and move forward and backwards in a single plane. In this case the rotatable joystick 41 can be replaced with a normal joystick 42 where the forward displacement d determines the root mean square wheel speed and the lateral displacement determines the radius of curvature of the path of the vehicle where moving the joystick 42 as far as it will go to the right will reduce the radius of curvature to zero and the vehicle will rotate about its own centre in a clockwise direction.

Alternatively a steering wheel 43 can be used by the driver to select the radius of curvature of the path of the vehicle. The root mean square wheel speed can be selected with a speed control lever or pedal 44. See FIG. 2(b)

The Second Special Case

Figure 3A:
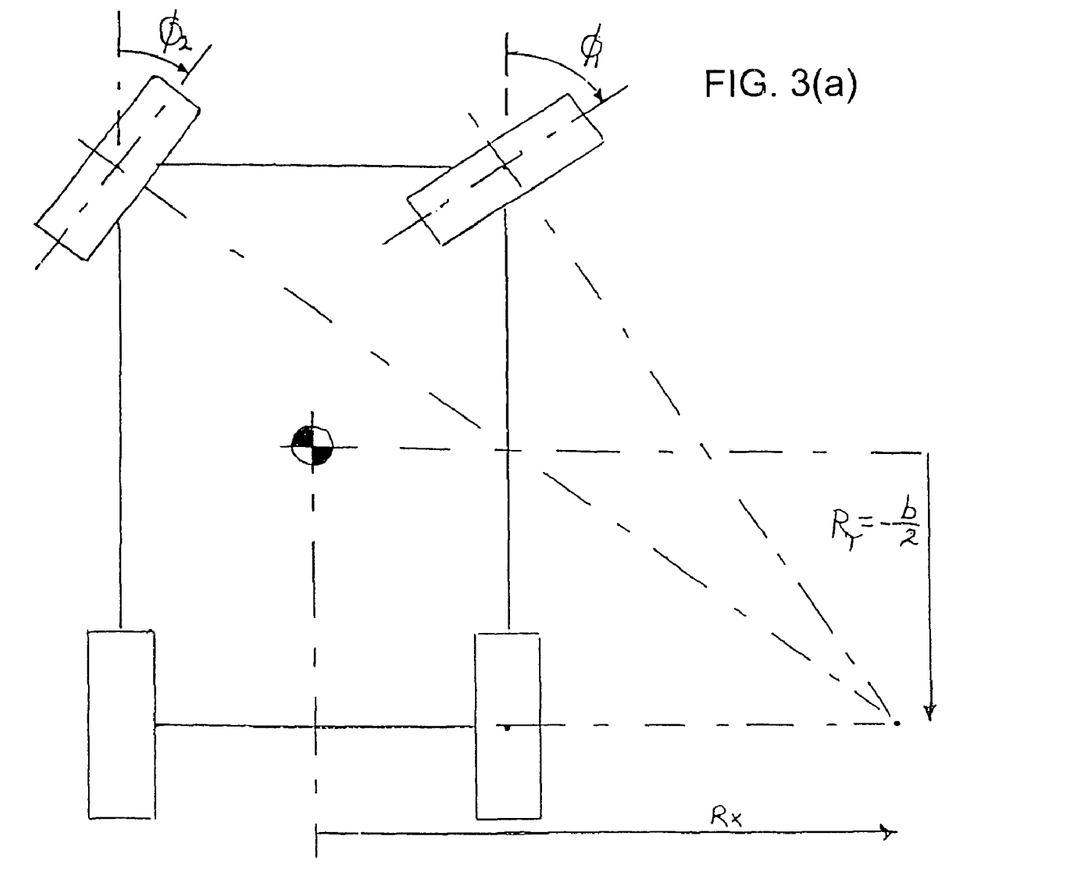
FIG. 3(a) depicts the special case where the centre of curvature of the path of the path of the vehicle lies on the axis of the rear wheels.

FIG. 3(a) shows that if $R_Y = -b/2$, then the eight control equations become:

$$\tan \phi_1 = b/(R_X - t/2)$$

$$\tan \phi_2 = b/(R_X + t/2)$$

$$\tan \phi_3 = \tan \phi_4 = 0$$

$$\omega_1 = KdR_1/\text{RMSR} \text{ where } R_1^2 = b^2 + (R_X - t/2)^2$$

$$\omega_2 = KdR_2/\text{RMSR} \text{ where } R_2^2 = b^2 + (R_X + t/2)^2$$

$$\omega_3 = KdR_3/\text{RMSR} \text{ where } R_3^2 = (R_X - t/2)^2$$

$$\omega_4 = KdR_4\text{RMSR} \text{ where } R_4^2 = (R_X + t/2)^2$$

$$\text{where RMSR} = (R_X^2 + b^2/2 + t^2/4)^{1/2}$$

Figure 3B:
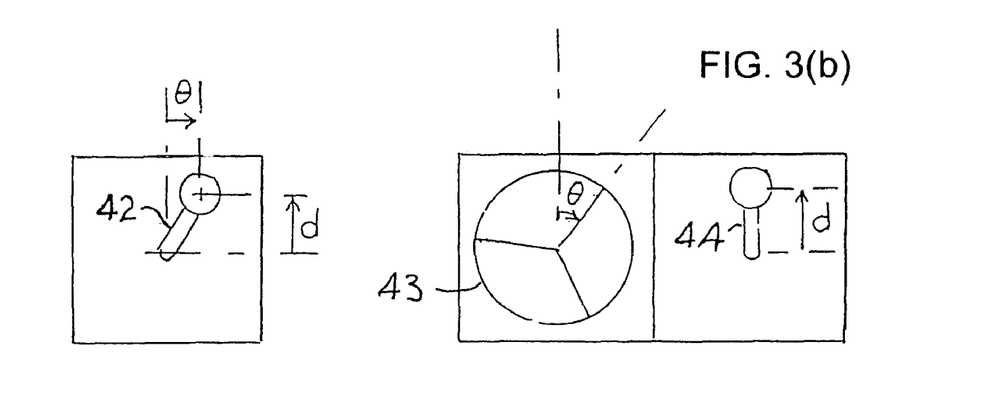
FIG. 3(b) shows two alternative driver interfaces for this vehicle.

In this case no steering system is required for the rear wheels since $\phi_3$ and $\phi_4$ are zero. See FIG. 3(a). The vehicle is further simplified if either the front or rear wheels are not driven (that is are free wheels) so that only two speed control systems are required. See FIG. 3(b).

The system used to control the wheel angles may work as follows:

The angle of a particular wheel will be measured. An on board computer will calculate (or approximate from a look up table) the correct angle from the driver's inputs of θ and ψ. If an error exists between the actual angle and the desired angle an actuator will be energised so as to eliminate this error. The on board computer will adjust the angles of all the other steerable wheels before repeating the cycle.

A similar system will be used to control the wheel speeds. The wheel speed of a particular wheel will be measured. The on board computer will calculate (or approximate from a look up table) the correct wheel speed from the driver's inputs of θ, ψ and d (the latter determining the root mean square wheel speed). If an error exists between the actual speed and the desired speed the drive to the wheel be adjusted so as to eliminate the error. The on board computer will adjust the speed of all other wheel speeds before repeating the cycle.

In large vehicles the actuators used to turn the wheels could be rotary hydraulic actuators. Alternatively double acting cylinders connected to rack and pinions could be used. In this case the engine 1 would also drive an auxiliary hydraulic pump (not shown in FIG. 1) which would drive the actuators via control valves activated by the on board computer.

In large vehicles the wheels could be driven by in built hydraulic motors which are powered by variable displacement hydraulic pumps. These pumps are driven by an internal combustion engine, which is governed to run at a constant speed. The speed of the wheels is controlled by varying the displacement of the pumps from a maximum flow in one direction to zero to maximum flow in the reverse direction. This allows the speed of the wheels to be varied from maximum forward to zero to maximum in reverse. The on board computer is used to alter the displacement of the pumps to produce the desired wheel speeds.

In smaller vehicles, such as wheel chairs, the wheels could be conveniently driven by electric motors. Similarly the wheels could be turned by electrically powered actuators. Storage batteries could be used to power the motors and the actuators. The motors and actuators would be controlled by an on board computer as indicated above.

Alternatively, the wheels could be driven by an internal combustion engine, via variable ratio friction drives. The wheels could be conveniently be turned by electric actuators. The friction drives and actuators would be controlled with the aid of an on board computer.

In an on road variant of the invention, higher wheel speeds and smaller wheel angles are required. Furthermore the displacement of the centre of curvature in the longitudinal direction is constant. In the four wheel steering/four wheel drive vehicle described in FIGS. 10(a) and 15(a) $R_Y = 0$. In the two wheel steering/four wheel drive or two wheel steering/two wheel drive vehicles described in FIG. 3(a) $R_Y = -b/2$. In these cases the wheel angles could be set by a steering wheel. The on board computer would positively control the wheel speeds to match the wheel angles selected. In this case the drive wheels would be driven mechanically by an internal combustion engine via a gear box and one or more traditional differentials where the wheel speeds are positively controlled by means of one or more steering differentials working in parallel with the one or more of the traditional differentials, where the speed of the electrically or hydraulically driven steering differentials are controlled by the on board computer.

Let us consider applying the invention to large dump trucks. In this application fuel efficiency is important and it is known that mechanical drives are more efficient than electrical drives and much more efficient than hydrostatic drives. In this application a zero turn radius is not required, so that the wheels are not required to turn through large angles. The maximum angle required is likely to be less than 30 degrees. In many cases only the front wheels are turned. These limitations make mechanical drives feasible. The preferred driver interface is a steering wheel, where the maximum angle of the steering wheel produces the maximum turn angle of the steerable wheels. Speed can be controlled with a speed control lever or pedal. See FIGS. 2(b) and 3(b).

Figure 4A:
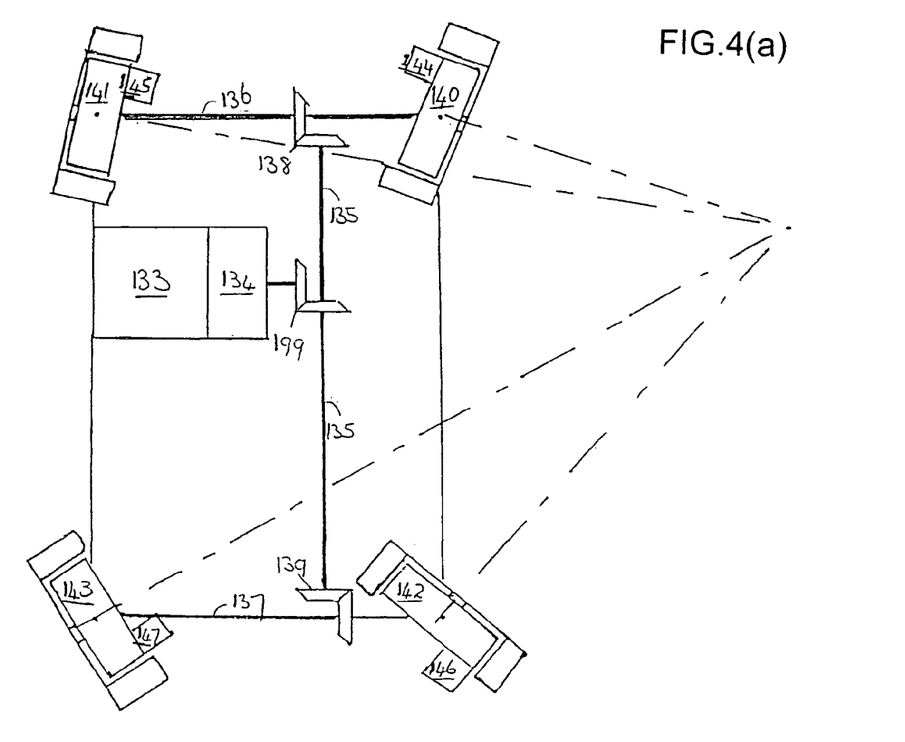
FIG. 4(a) shows a four wheel steering/four wheel drive vehicle where four steering differentials are integrated with four speed reduction gearboxes close coupled to the wheels.

FIG. 4(a) shows the layout of a vehicle incorporating a computer integrated steering/drive system where the hydraulic wheel motors are replaced with speed-correcting differentials close coupled to each driven wheel. These speed-correcting differentials may be integrated into speed reduction gear boxes also close coupled to each driven wheel. In this case engine 133 drives gear box 134 which in turn drives an integrated front and wheel tail shaft 135 by means of right angle drive 199 which in turn drives front and rear drive shafts 136 and 137 by means of right angle drives 138 and 139. The front and rear drive shafts 136 and 137 drive integrated speed reduction gearbox/steering differentials 140, 141, 142 and 143. Each integrated speed reduction gearbox/steering differential is also driven by wheel speed correcting hydraulic motors 144, 145, 146 and 147. The wheel speed-correcting hydraulic motors ensure that the steering effect of all wheel speeds is identical to the steering effect of all the wheel angles.

Figure 4B:
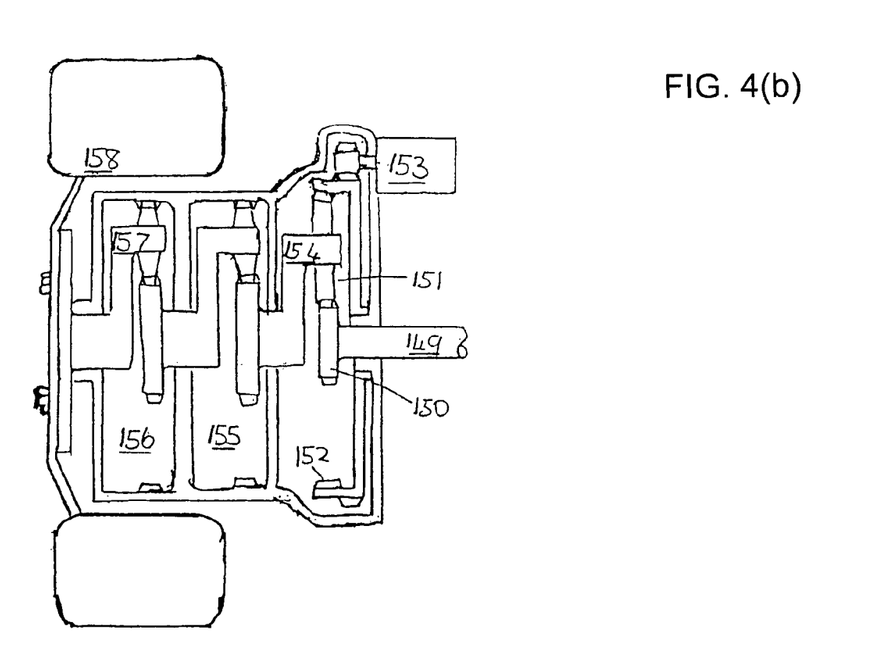
FIG. 4(b) shows the construction of an integrated speed reduction gearbox/steering differential.

FIG. 4(b) shows the detailed layout of the integrated speed reduction gearbox/steering differential. This is a three stage compound epicyclic gearbox where the steering differential is incorporated into the first stage. Power is transmitted to the integrated gearbox/differential by means of drive shaft 149, which drives sun gear 150. Sun gear 150 drives planet gear 151, which is also driven by annular gear 152. Annular gear 152 is driven by the speed correcting hydraulic motor 153 as required. Planet gear 151 is supported by arm (or cage) 154, which drives the sun gear of stage two 155. Stage two 155 and stage three 156 are similar to stage one, except that the annular gears in the latter two stages are fixed to the housing and are thereby stationary. The arm (or cage) 157 of the last stage is connected to the drive wheel 158. For the sake of simplicity only one planet gear is shown in each stage. In practice more planet gears would be used to both balance the rotating parts and share the load.

In principle the hydraulic speed correcting motor could drive any one of the three annular gears. However if the first stage annular gear is driven, a more convenient higher speed low torque hydraulic motor can be used. Note that the hydraulic motor could be replaced by an electric motor with appropriate speed control.

Note that the lower efficiency of the speed correcting hydraulic motor will have little effect on the overall drive efficiency since only a small fraction of the output power is provided by the hydraulic motor.

Figure 5:
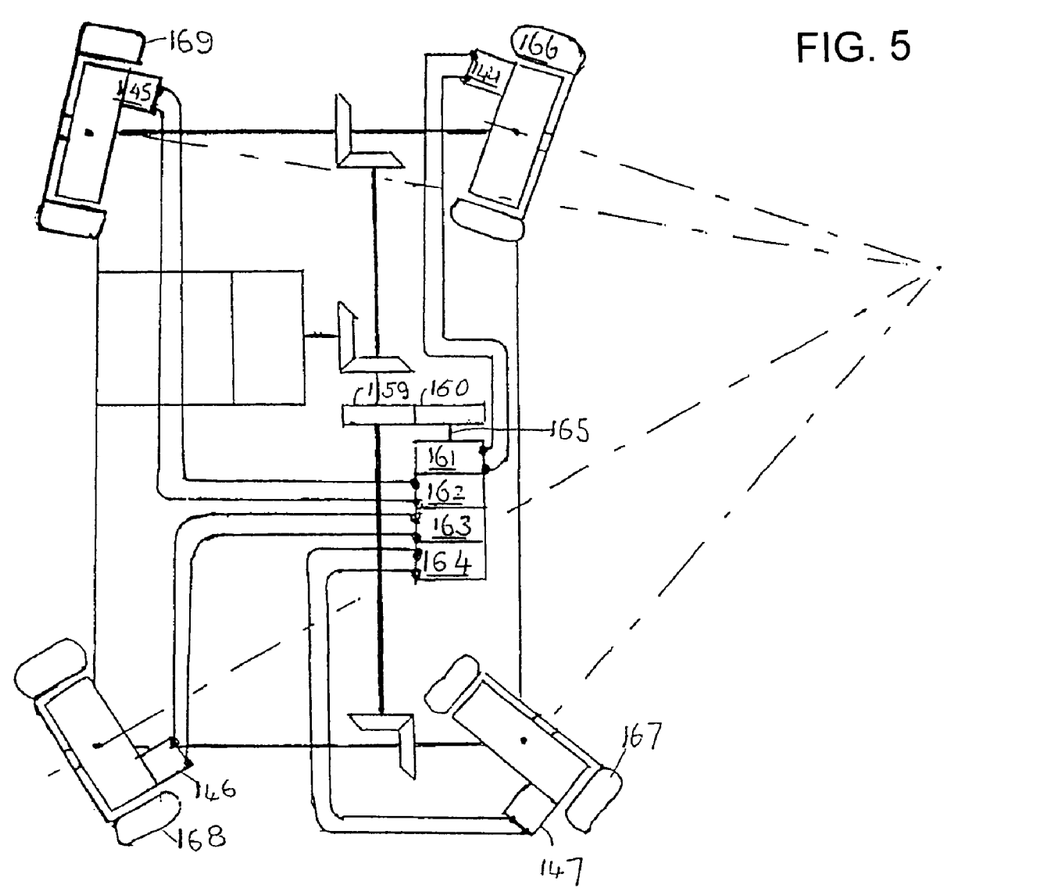
FIG. 5 shows the layout of the hydrostatic drives to the steering motors.

FIG. 5 shows a hydraulic circuit which would allow the wheel speed correcting motors 144, 145, 146 and 147 to rotate at appropriate speeds. Each hydraulic motor is driven by a variable displacement pump. These pumps 161, 162, 163 and 164 are driven by a common shaft 165 at a speed proportional to the tail shaft speed by means of gears 159 and 160. This arrangement automatically compensates the speed of the pumps for the overall speed of the vehicle. When the vehicle is turning to the right, the right hand pumps slow the right hand wheels and the left hand pumps speed up the left hand wheels. The amount of speeding up and slowing down is determined by the displacement of each of the variable displacement pumps. These displacements are determined by the squash plate angle of each pump.

In the vehicles depicted in FIG. 5 the computer integrated steering/drive system can be implemented as follows:

The driver selects the centre of curvature of the path of the vehicle and the average wheel speed. The on board computer then calculates the angle and speed of each wheel that ensures that the steering effect of the wheel angles is identical to the steering effect of the wheel speeds. The on board computer then turns the wheels 166, 167, 168 and 169 to the calculated angles. The computer also calculates the appropriate speed for each wheel speed correcting hydraulic motors 144, 145, 146 and 147, and implements these speeds by adjusting the squash plate angles of the respective variable displacement hydraulic pumps 161, 162, 163 and 164.

Figure 6A:
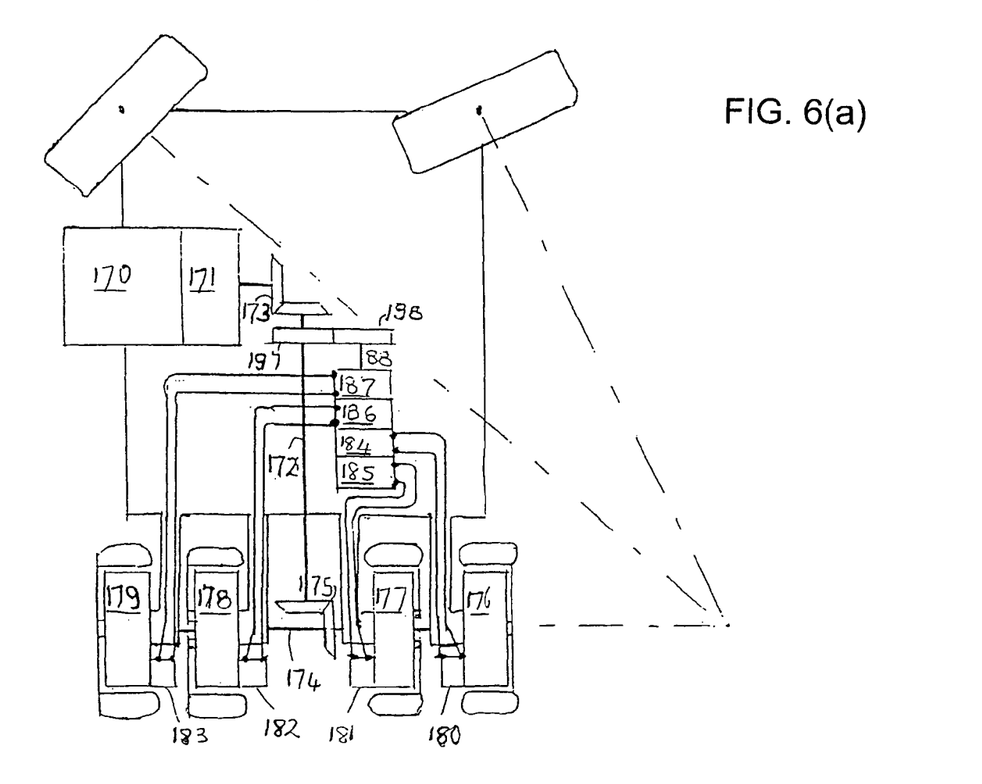
FIG. 6(a) shows the layout of the hydrostatic drive to the steering motors close coupled to the four rear wheels where the steering effect of the speed of all four wheels is identical to the steering effect of the angles of all six wheels.

FIG. 6(*a*) depicts a vehicle where the four rear drive wheels are driven independently so that the wheel speed steering effect of all four wheels is identical to the steering effect of the angles of all six wheels (i.e. the four coaxial drive wheels, and the two steerable non driven wheels).

In this vehicle engine 170 drives gearbox 171, which in turn drives a tail shaft 172 via right angle drive 173. The tail shaft 173 drives a drive shaft 174 via a second right angle drive 175. The drive shaft 174 drives four integrated speed reduction gearbox/speed correcting differentials 176, 177, 178 and 179. The speed correcting differentials 176, 177, 178 and 179 are also driven as required by four wheel speed correcting hydraulic motors 180, 181, 182 and 183. These hydraulic motors 180, 181, 182 and 183 are driven by variable displacement hydraulic pumps 184, 185, 186 and 187 respectively. These hydraulic pumps are driven by a common shaft 188, which is rotated at a speed proportional to the tail shaft speed by means of gears 197 and 198. The advantage of this arrangement is that it enables all four drive wheels to be driven at slightly different speeds on turning. The outer wheels 176 and 179 may be slowed down and speeded up more than the inner wheels 177 and 178.

Figure 6B:
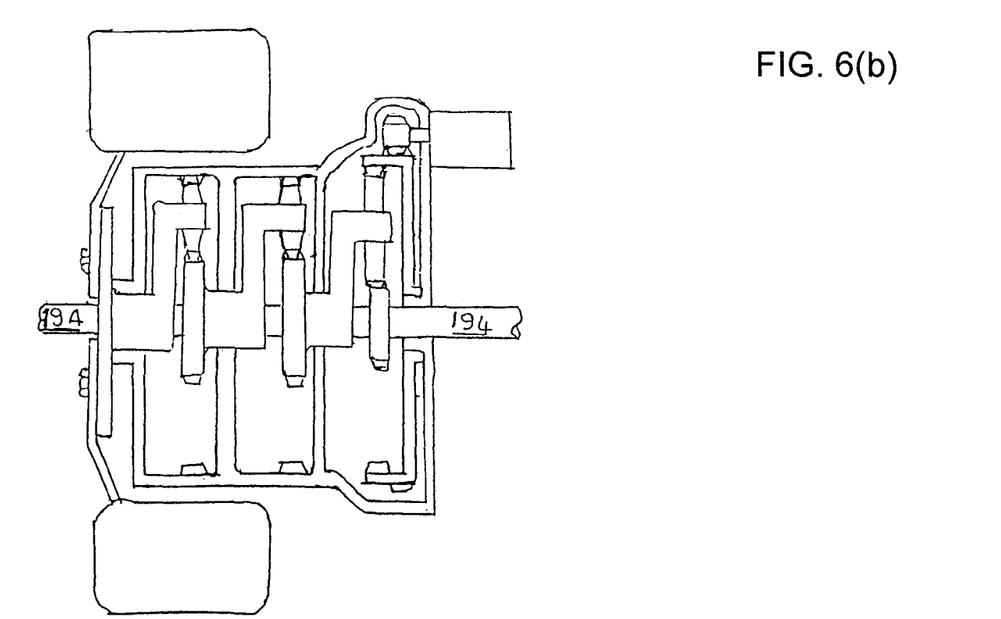
FIG. 6(b) shows the construction of an integrated speed reduction gearbox/steering differential suitable for driving an inner drive wheel.

FIG. 6(*b*) shows the detailed layout of an integrated speed reduction gear box/speed correcting differential suitable for driving an inner wheel. In this case the drive shaft 194 must pass through the integrated speed reduction gearbox/speed correcting differential so that it can also drive the outer wheel 179.

Figure 7:
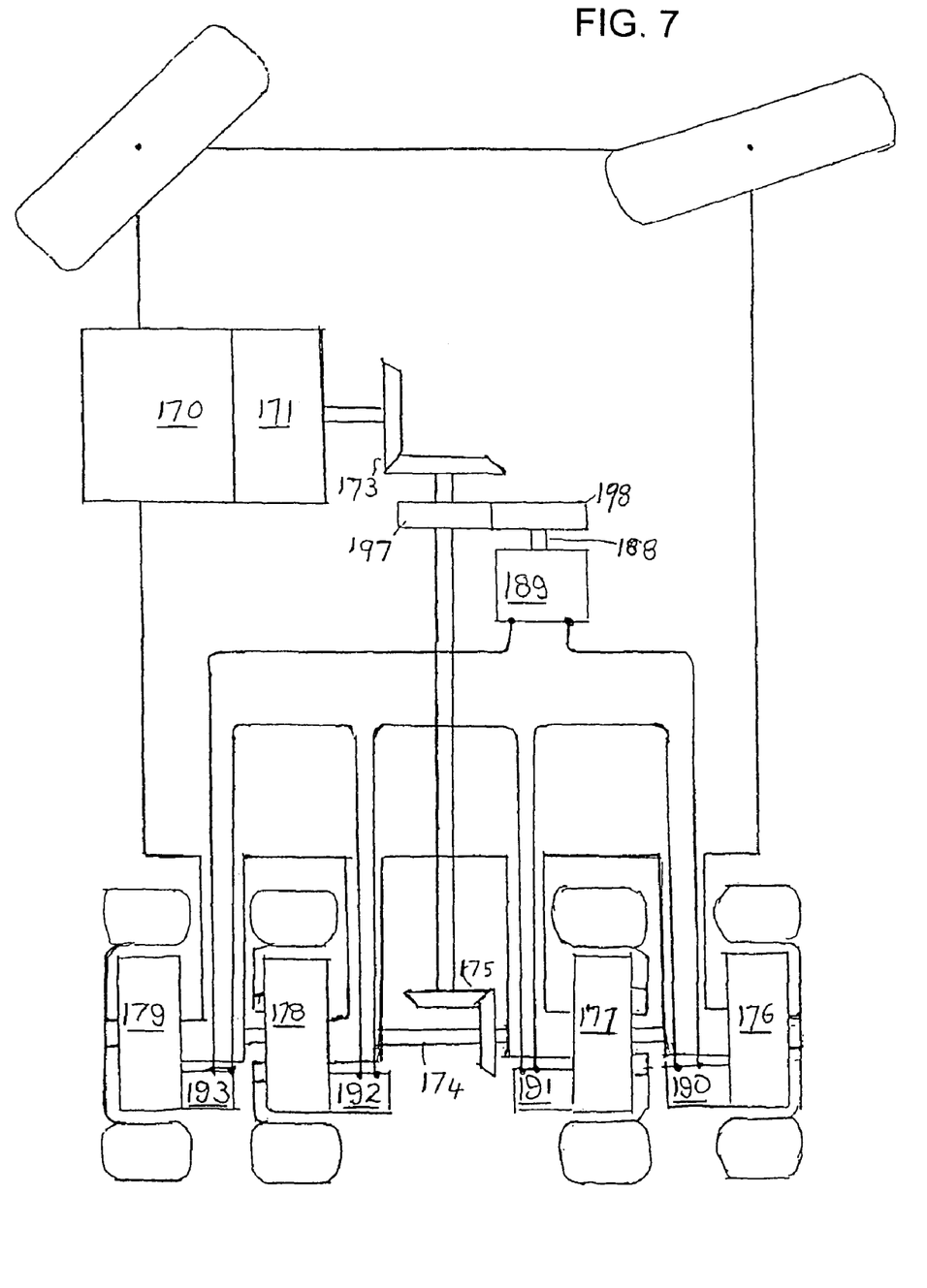
FIG. 7 shows the layout of a simplified hydrostatic drive to the steering motors close coupled to the four rear wheels.

FIG. 7 shows a simplified version of a vehicle where the four rear drive wheels are driven at four different speeds on turning. In this case a single variable displacement hydraulic pump 189 is used to drive all four speed correcting hydraulic motors 190, 191, 192 and 193, which are now connected in series. The displacement of the inner and outer speed correcting hydraulic motors is inversely proportional to the distance of the respective wheels from the centre line of the vehicle.

In the vehicles depicted in FIGS. 6 and 7 the computer integrated steering drive system can be implemented as follows:

The driver selects the radius of curvature of the path of the vehicle with a steering wheel and the average wheel speed with a speed control lever or pedal. The on board computer calculates the appropriate angles of the front wheels and the individual speeds of the four rear drive wheels, and the required speed of the four wheel speed correcting hydraulic motors 180, 181, 182 and 183 or 190, 191, 192 and 193. The computer implements the calculated front wheel angles and calculated hydraulic motor speeds. The required hydraulic motor speeds are achieved by adjusting the squash plate angles of the four variable displacement pumps 184, 185, 186 and 187 or the single variable displacement pump 189.

It should be noted that if the speed of the drive wheels is positively controlled by any of the methods outlined above, the wheel speed steering effect applies when the vehicle is being braked (or decelerated) as well as when the vehicle is being driven (or accelerated).

The invention claimed is:

1. A vehicle comprising four or more wheels, at least two of which are driven wheels and at least two of which is steerable, where the axes of rotation of all wheels lie substantially in the same horizontal plane, and where the steerable wheels are turnable about substantially vertical axes by means of hydraulic or electric actuators, where the speed of each driven wheel is controlled by means of a speed-correcting differential which is close-coupled to each driven wheel, where the first input to the said differential is from an engine via a main gear box and a series of right angle drives, and the second input to the said speed correcting differential is provided by means of a speed correcting electric or hydraulic motor which is close coupled to the said differential, where the speed of each driven wheel is determined by the speed of the first input, which will be the same for all driven wheels, and the speed and direction of rotation of the speed correcting electric or hydraulic motor, where the speeds of the driven wheels are independently and positively controlled so that they tend to produce a single centre of curvature for the path of the vehicle, and where all the wheel angles are positively controlled to produce a single driver-selected centre of curvature for the path of the vehicle, and where the driven wheel speeds and all the wheel angles are integrated so that the first centre of curvature is made identical to the second centre of curvature which is selected by the driver.

2. A vehicle according to claim 1 where each speed correcting hydraulic motor is singly connected in series to a variable displacement pump.

3. A vehicle according to claim 1 where each speed correcting gear box which is close coupled to a driven wheel, is incorporated into a speed reduction gear box which is also close coupled to each driven wheel.

4. A vehicle according to claim 1 wherein:

The driver selects the centre of curvature for the path of the vehicle with a rotatable joystick, where the line on which the said centre of curvature lies is at right angles to the direction of displacement of the joystick, and the position of the said centre of curvature on this line is determined by the rotation of the joystick from its null position, and the root mean square wheel speed for all wheels and their direction of rotation is determined by the amount of displacement of the joystick from its null position.

5. A vehicle according to claim 1 wherein:

The driver selects the centre of curvature for the path of the vehicle with two joysticks, where the line on which the said centre of curvature lies is at right angles to the direction of displacement of the second joystick, and the position of the said centre of curvature on this line is determined by the sideways displacement of the first joystick from its null position, and the root mean square wheel speed for all wheels and their direction of rotation is determined by the amount of displacement of the first joystick from its null position.

6. A vehicle according to claim 1 wherein:

The driver selects the centre of curvature for the path of the vehicle with a steering wheel and a single joystick, where the line on which the said centre of curvature lies is at right angles to the direction of displacement of the single joystick, and the position of the said centre of curvature on this line is determined by the rotation of the steering wheel from its null position, and the root mean square wheel speed for all wheels and their direction of rotation is determined by the amount of displacement of the single joystick from its null position.

7. A vehicle according to claim 4 comprising four rectangularly arranged wheels, where all wheels are both driven and steered wherein a control system adjusts the rotational velocity and steering angle of each said wheel according to the following equations:

$$R/t = \cot(90° \, \theta/\theta_{max}) = (R_X^2 + R_Y^2)^{1/2}/t;$$

$$\tan \psi = R_Y/R_X;$$

$$R_Y = R/(\tan^2\psi + 1)^{1/2} = R \sin \Psi;$$

$$R_X = R \tan \psi/(\tan^2\psi + 1)^{1/2} = R \cos \Psi;$$

$$\tan \phi_1 = (b/2 - R_Y)/(R_X - t/2);$$

$$\tan \phi_2 = (b/2 - R_Y)/(R_X - t/2);$$

$$\tan \phi_3 = (b/2 - R_Y)/(R_X - t/2);$$

$$\tan \phi_4 = (b/2 - R_Y)/(R_X - t/2);$$

$$\omega_1 = KdR_1/\text{RMSR where } R_1^2 = (b/2 - R_Y)^2 + (R_X - t/2)^2;$$

$$\omega_2 = KdR_2/\text{RMSR where } R_2^2 = (b/2 - R_Y)^2 + (R_X - t/2)^2;$$

$$\omega_3 = KdR_3/\text{RMSR where } R_3^2 = (b/2 - R_Y)^2 + (R_X - t/2)^2;$$

$$\omega_4 = KdR_4/\text{RMSR where } R_4^2 = (b/2 - R_Y)^2 + (R_X - t/2)^2;$$

Where RMSR is the root mean square radius which is given by the equation:

$$\text{RMSR} = (R_1^2 + R_2^2 + R_3^2 + R_4^2)^{1/2}/2 = (R_X^2 + R_Y^2 + t^2/4 + b^2/4)^{1/2};$$

and RMSWS is the root mean square wheel speed which is given by the equation:

$$\text{RMSWS} = Kd = (\omega_1^2 + \omega_2^2 + \omega_3^2 + \omega_4^2)^{1/2}/2;$$

where $\omega_1$ and $\phi_1$ are the rotational velocity and the steering angle (clockwise positive) of the front right hand wheel respectively $\omega_2$ and $\phi_2$ are the rotational velocity and the steering angle (clockwise positive) of the front left hand wheel respectively $\omega_3$ and $\phi_3$ are the rotational velocity and the steering angle (anticlockwise positive) of the rear right hand wheel respectively $\omega_4$ and $\phi_4$ are the rotational velocity and the steering angle (anticlockwise positive) of the rear left hand wheel respectively R is the radius of curvature of the path of the vehicle $R_X$ is the distance of the centre of curvature of the path of the vehicle to the right of the vehicle centre $R_Y$ is the distance of the centre of curvature of the path of the vehicle forward of the vehicle centre b is the wheel base of the vehicle t is the track of the vehicle $R_1$, $R_2$, $R_3$, and $R_4$ are the distances of the front right hand wheel, the front left hand wheel, the rear right hand wheel and the rear left hand wheel respectively from the centre of curvature of the path of the vehicle d is the displacement of the joy stick, where the centre of curvature of the path of the vehicle is at right angles to the direction of displacement of the joystick $\psi$ is the angle of displacement of the joystick to the left of the straight ahead position K is a suitable constant $\theta$ is the angle of rotation of the joystick, and $\theta_{max}$ is the maximum angle of rotation of the joystick.

8. A vehicle according to claim 5 comprising four rectangularly arranged wheels, where all wheels are both driven and steered wherein a control system adjusts the rotational velocity and steering angle of each said wheel according to the following equations:

$$R/t = \cot(90° \, \theta/\theta_{max}) = (R_X^2 + R_Y^2)^{1/2}/t;$$

$$\tan \psi = R_Y/R_X;$$

$$R_Y = R/(\tan^2\psi + 1)^{1/2} = R \sin \Psi;$$

$$R_X = R \tan \psi/(\tan^2\psi + 1)^{1/2} = R \cos \Psi;$$

$$\tan \phi_1 = (b/2 - R_Y)/(R_X - t/2);$$

$$\tan \phi_2 = (b/2 - R_Y)/(R_X - t/2);$$

$$\tan \phi_3 = (b/2 - R_Y)/(R_X - t/2);$$

$$\tan \phi_4 = (b/2 - R_Y)/(R_X - t/2);$$

$$\omega_1 = KdR_1/\text{RMSR where } R_1^2 = (b/2 - R_Y)^2 + (R_X - t/2)^2;$$

$$\omega_2 = KdR_2/\text{RMSR where } R_2^2 = (b/2 - R_Y)^2 + (R_X - t/2)^2;$$

$$\omega_3 = KdR_3/\text{RMSR where } R_3^2 = (b/2 - R_Y)^2 + (R_X - t/2)^2;$$

$$\omega_4 = KdR_4/\text{RMSR where } R_4^2 = (b/2 - R_Y)^2 + (R_X - t/2)^2;$$

Where RMSR is the root mean square radius which is given by the equation:

$$\text{RMSR} = (R_1^2 + R_2^2 + R_3^2 + R_4^2)^{1/2}/2 = (R_X^2 + R_Y^2 + t^2/4 + b^2/4)^{1/2};$$

and RMSWS is the root mean square wheel speed which is given by the equation:

$$\text{RMSWS} = Kd = (\omega_1^2 + \omega_2^2 + \omega_3^2 + \omega_4^2)^{1/2}/2;$$

where $\omega_1$ and $\phi_1$ are the rotational velocity and the steering angle (clockwise positive) of the front right hand wheel respectively $\omega_2$ and $\phi_2$ are the rotational velocity and the steering angle (clockwise positive) of the front left hand wheel respectively $\omega_3$ and $\phi_3$ are the rotational velocity and the steering angle (anticlockwise positive) of the rear right hand wheel respectively $\omega_4$ and $\phi_4$ are the rotational velocity and the steering angle (anticlockwise positive) of the rear left hand wheel respectively R is the radius of curvature of the path of the vehicle $R_X$ is the distance of the centre of curvature of the path of the vehicle to the right of the vehicle centre $R_Y$ is the distance of the centre of curvature of the path of the vehicle forward of the vehicle centre b is the wheel base of the vehicle t is the track of the vehicle $R_1$, $R_2$, $R_3$, and $R_4$ are the distances of the front right hand wheel, the front left hand wheel, the rear right hand wheel and the rear left hand wheel respectively from the centre of curvature of the path of the vehicle d is the forward or backward displacement of the first joy stick, where the centre of curvature of the path of the vehicle is at right angles to the direction of displacement of the second joystick $\psi$ is the angle of displacement of the second joystick to the left of the straight ahead position K is a suitable constant $\theta$ is the sideways displacement of the first joystick, and $\theta_{max}$ is the maximum sideways displacement of the first joystick.

9. A vehicle according to claim 6 comprising four rectangularly arranged wheels, where all wheels are both driven and steered wherein a control system adjusts the rotational velocity and steering angle of each said wheel according to the following equations:

$$R/t = \cot(90° \, \theta/\theta_{max}) = (R_X^2 + R_Y^2)^{1/2}/t;$$

$$\tan \psi = R_Y/R_X;$$

$$R_Y = R/(\tan^2\psi+1)^{1/2} = R \sin \Psi;$$

$$R_X = R \tan \psi/(\tan^2\psi+1)^{1/2} = R \cos \Psi;$$

$$\tan \phi_1 = (b/2 - R_Y)/(R_X - t/2);$$

$$\tan \phi_2 = (b/2 - R_Y)/(R_X - t/2);$$

$$\tan \phi_3 = (b/2 - R_Y)/(R_X - t/2);$$

$$\tan \phi_4 = (b/2 - R_Y)/(R_X - t/2);$$

$$\omega_1 = KdR_1/\text{RMSR where } R_1^2 = (b/2 - R_Y)^2 + (R_X - t/2)^2;$$

$$\omega_2 = KdR_2/\text{RMSR where } R_2^2 = (b/2 - R_Y)^2 + (R_X - t/2)^2;$$

$$\omega_3 = KdR_3/\text{RMSR where } R_3^2 = (b/2 - R_Y)^2 + (R_X - t/2)^2;$$

$$\omega_4 = KdR_4/\text{RMSR where } R_4^2 = (b/2 - R_Y)^2 + (R_X - t/2)^2;$$

Where RMSR is the root mean square radius which is given by the equation:

$$\text{RMSR} = (R_1^2 + R_2^2 + R_3^2 + R_4^2)^{1/2}/2 = (R_X^2 + R_Y^2 + t^2/4 + b^2/4)^{1/2};$$

and RMSWS is the root mean square wheel speed which is given by the equation:

$$\text{RMSWS} = Kd = (\omega_1^2 + \omega_2^2 + \omega_3^2 + \omega_4^2)^{1/2}/2;$$

where $\omega_1$ and $\phi_1$ are the rotational velocity and the steering angle (clockwise positive) of the front right hand wheel respectively $\omega_2$ and $\phi_2$ are the rotational velocity and the steering angle (clockwise positive) of the front left hand wheel respectively $\omega_3$ and $\phi_3$ are the rotational velocity and the steering angle (anticlockwise positive) of the rear right hand wheel respectively $\omega_4$ and $\phi_4$ are the rotational velocity and the steering angle (anticlockwise positive) of the rear left hand wheel respectively R is the radius of curvature of the path of the vehicle $R_X$ is the distance of the centre of curvature of the path of the vehicle to the right of the vehicle centre $R_Y$ is the distance of the centre of curvature of the path of the vehicle forward of the vehicle centre b is the wheel base of the vehicle t is the track of the vehicle $R_1$, $R_2$, $R_3$, and $R_4$ and are the distances of the front right hand wheel, the front left hand wheel, the rear right hand wheel and the rear left hand wheel respectively from the centre of curvature of the path of the vehicle d is the amount of displacement of the single joy stick, where the centre of curvature of the path of the vehicle is at right angles to the direction of displacement of the single joystick $\psi$ is the angle of displacement of the single joystick to the left of the straight ahead position K is a suitable constant $\theta$ is the rotation of the steering wheel from its null position, and $\theta_{max}$ is the maximum rotation of the steering wheel from its null position.

10. A vehicle according to claim 1 comprising four rectangularly arranged wheels, where all wheels are both driven and the front wheels are steered wherein a control system adjusts the rotational velocity and steering angle of each said wheel according to the following equations:

$$R_X/t = \cot(90° \, \theta/\theta_{max})$$

$$R_Y = -b/2 \text{ and } \psi = 0 \text{ so that:}$$

$$\tan \phi_1 = b/(R_X - t/2);$$

$$\tan \phi_2 = b/(R_X + t/2);$$

$$\tan \phi_3 = \tan \phi_1 = 0;$$

$$\omega_1 = KdR_1/\text{RMSR where } R_1^2 = b^2 + (R_X - t/2)^2;$$

$$\omega_2 = KdR_2/\text{RMSR where } R_2^2 = b^2 + (R_X - t/2)^2;$$

$$\omega_3 = KdR_3/\text{RMSR where } R_3^2 = b^2 + (R_X - t/2)^2;$$

$$\omega_4 = KdR_4/\text{RMSR where } R_4^2 = b^2 + (R_X - t/2)^2;$$

Where RMSR is the root mean square radius which is given by the equation:

$$\text{RMSR} = (R_1^2 + R_2^2 + R_3^2 + R_4^2)^{1/2}/2 = (R_X^2 + t^2/4 + b^2/2)^{1/2};$$

and RMSWS is the root mean square wheel speed which is given by the equation:

$$\text{RMSWS} = Kd = (\omega_1^2 + \omega_2^2 + \omega_3^2 + \omega_4^2)^{1/2}/2;$$

where $\omega_1$ and $\phi_1$ are the rotational velocity and the steering angle (clockwise positive) of the front right hand wheel respectively $\omega_2$ and $\phi_2$ are the rotational velocity and the steering angle (clockwise positive) of the front left hand wheel respectively $\omega_3$ and $\phi_3$ are the rotational velocity and the steering angle (anticlockwise positive) of the rear right hand wheel respectively $\omega_4$ and $\phi_4$ are the rotational velocity and the steering angle (anticlockwise positive) of the rear left hand wheel respectively R is the radius of curvature of the path of the vehicle $R_X$ is the distance of the centre of curvature of the path of the vehicle to the right of the vehicle centre $R_Y = -b/2$ and is the distance of the centre of curvature of the path of the vehicle forward of the vehicle centre b is the wheel base of the vehicle t is the track of the vehicle $R_1$, $R_2$, $R_3$, and $R_4$ are the distances of the front right hand wheel, the front left hand wheel, the rear right hand wheel and the rear left hand wheel respectively from the centre of curvature of the path of the vehicle d is the amount of displacement of the single joy stick, which now becomes a single lever K is a suitable constant $\theta$ is the rotation of the steering wheel from its null position, and $\theta_{max}$ is the maximum rotation of the steering wheel from its null position.

11. A vehicle according to claim 10 where each speed correcting hydraulic motor is singly connected in series to a variable displacement pump.

12. A vehicle according to claim 10 where all speed correcting hydraulic motors are connected in series to a single variable displacement pump.

13. A vehicle according to claim 1 comprising six wheels, four of which not steerable and are located on the same axis and are independently driven, and two wheels are steerable but not driven.

14. A vehicle according to claim 13 where each speed correcting hydraulic motor is singly connected in series to a variable displacement pump.

15. A vehicle according to claim 13 where all speed correcting hydraulic motors are connected in series to a single variable displacement pump.

16. A vehicle according to claim 13 where the driver interface comprises a steering wheel and a speed control lever or pedal.

17. A vehicle according to claim 14 where the driver interface comprises a steering wheel and a speed control lever or pedal.

18. A vehicle according to claim 15 where the driver interface comprises a steering wheel and a speed control lever or pedal.

19. A vehicle according to claim 1 where the centre of curvature selected by the driver must lie on the transverse axis of the vehicle.

20. A vehicle according to claim 3 where the centre of curvature selected by the driver must lie on the transverse axis of the vehicle.

* * * * *